United States Patent
Ku

(10) Patent No.: US 9,428,214 B2
(45) Date of Patent: Aug. 30, 2016

(54) STEERING COLUMN FOR VEHICLE

(71) Applicant: Mando Corporation, Pyeongtaek-si, Gyeonggi-do (KR)

(72) Inventor: Sang Chul Ku, Seoul (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/971,505

(22) Filed: Dec. 16, 2015

(65) Prior Publication Data
US 2016/0176436 A1     Jun. 23, 2016

(30) Foreign Application Priority Data
Dec. 18, 2014  (KR) ......................... 10-2014-0182860

(51) Int. Cl.
B62D 1/19     (2006.01)
(52) U.S. Cl.
CPC ..................................... B62D 1/195 (2013.01)
(58) Field of Classification Search
CPC ...................................................... B62D 1/195
See application file for complete search history.

(56) References Cited

U.S. PATENT DOCUMENTS 8,783,717 B2 * 7/2014 Tinnin .................. B62D 1/184
280/777
8,894,097 B2 * 11/2014 Sulser .................. B62D 1/184
280/777
9,242,667 B2 * 1/2016 Yoshihara ............. B62D 1/184
2015/0096404 A1 * 4/2015 Martinez ............... B62D 1/195
74/492

FOREIGN PATENT DOCUMENTS

JP       2010-228681 A     10/2010
KR   10-2014-0104721 A      8/2014

* cited by examiner

*Primary Examiner* — Nicole Verley
(74) *Attorney, Agent, or Firm* — McDermott Will & Emery LLP

(57) ABSTRACT

The present invention relates to a steering column for a vehicle. The steering column of a vehicle includes: an adjusting bolt that passes through tilting guide holes having slot shapes and are formed on opposite sides of a plate bracket, and telescoping guide holes having slot shapes and are formed on opposite sides of a distance bracket; and an impact absorbing member having a hollow pipe shape into which the adjusting bolt is inserted therein, and having tilting impact absorbing parts, which protrude on an outer peripheral surface thereof that are supported by opposite lengthwise ends of the tilting guide hole, and telescoping impact absorbing parts, which protrude on the outer peripheral surface thereof that are supported by opposite lengthwise ends of the telescoping guide hole. The steering column for a vehicle can allow an impact absorbing member no absorb an impact that is generated when an adjusting bolt collides with a tilting guide hole or a telescoping guide hole during a tilting or telescoping operation, thereby improving the operational feeling and reducing operational noise.

13 Claims, 8 Drawing Sheets

STEERING COLUMN FOR VEHICLE

CROSS-REFERENCE TO RELATED APPLICATION

This application claims priority from and the benefit under 35 U.S.C. §119(a) of Korean Patent Application No. 10-2014-0182860, filed on Dec. 18, 2014, which is hereby incorporated by reference for all purposes as if fully set forth herein.

BACKGROUND OF THE INVENTION

1. Field of the Invention

The present invention relates to a steering column for a vehicle. More particularly, it relates to a steering column for vehicle that allows impact absorbing member to absorb an impact that is generated when an adjusting bolt collides with tilting guide hole or telescoping guide hole during a tilt or telescoping operation, thereby improving the operational feeling and reducing operational noise.

2. Description of the Prior Art

In general, a steering column for a vehicle is an apparatus that surrounds a steering shaft for transmitting a rotational force that is generated through the manipulation of the steering wheel by the driver to a rack and pinion mechanism in order to support the rotation of the steering shaft. The steering column is coupled to the body shell through a bracket to fix the location of the steering shaft.

A telescoping or tilting function may be added to the steering column for the convenience of the driver, in which the tilting apparatus is an apparatus for adjusting the fixing angle of the steering wheel. The telescoping apparatus is formed by mounting two hollow pipes such that the steering column may be extended and contracted axially. When the vehicle experiences a collision, the steering shaft and the steering column collapse in order to absorb impact energy.

Accordingly, the steering apparatus may be classified into telescoping and tilting steering apparatuses according to the functions, and a tilting function may be added to a telescoping steering apparatus according to occasions. The driver can smoothly manipulate the steering operation by adjusting the protrusion degree or the inclination angle of the steering wheel in correspondence to the height or body shape of the driver through the functions.

FIG. 1 is an exploded perspective view of a part of a steering column for a vehicle according to the related art.

As illustrated in FIG. 1, the steering column 100 for a vehicle, according to the related art, includes: an outer tube 101 in which a steering shaft 175 is accommodated; an inner tube 170 inserted lots; the outer tube 101; a lower mounting bracket 165 installed in the inner tube 170 and fixed to the body shell; an upper mounting bracket 105 installed on the upper side of the outer tube 101 and fixed to the body shell; a distance bracket 180 coupled to the outer tube 101 and having a telescoping hole 185; a plate bracket 150 formed integrally with the upper mounting bracket 105 and having a long tilting slot 110; a telescoping fixed gear 181 provided on an outer surface of the distance bracket 180; a tilting fixed gear 145 provided on an outer surface of the plate bracket 150; a movable gear block 129 including a telescoping actuating gear 162 that is engaged with or separated from the telescoping fixed gear 181 and a tilting actuating gear 140 that is engaged with or separated from the tilting fixed gear 145; a cam 135 coupled to the movable gear block 129; an adjusting bolt 130 that passes through the telescoping slot 185 and the tilting slot 110 in order to pass through the movable gear block 129 and an adjusting lever 115; a nut 120 coupled to the adjusting bolt 130 such that the movable gear block 129 and the adjusting lever 115 may be fixed; springs interposed between the actuating gears 140 and 180 and the movable gear block 129; and a washer 125 interposed between the adjusting lever 115 and the nut 120.

The tilting and telescoping operations are applied by fastening and releasing the adjusting lever 115, and are achieved by the principle stating that if the adjusting lever 115 is fastened, the plate bracket 150 is narrowed to apply a pressing force to the outer tube 101 such that the outer tube 101 and the inner tube 170 are attached to each other by the pressing force, disenabling a tilting operation and a telescoping operation, and in contrast, if the adjusting lever 115 is released, the pressing force between the outer tube 101 and the inner tube 170 disappears, allowing a tilting or telescoping operation.

The telescoping operation is completed by releasing the adjusting lever 115, changing the location of the adjusting bolt 130 along the telescoping slot 185 formed in the distance bracket 180, and fastening the adjusting lever 115.

The tilting operation is completed by releasing the adjusting lever 115, changing the location of the adjusting bolt 130 along the tilting slot 110, and fastening the adjusting lever 115.

When the adjusting lever 115 is locked, the outer tube 101, the steering shaft 115, and the like are fixed, but if the adjusting lever 115 is released, the outer tube 101, the inner tube 170, and the like are tilted with respect to a tilting center 160 by the cam 135, or the steering column is extended or contracted axially.

However, the steering column for a vehicle, according to the related art, generates operational noise due to an impact generated when the adjusting bolt collides with the tilting guide hole or the telescoping guide hole during a tilting or telescoping operation.

SUMMARY OF THE INVENTION

The present invention has been made in an effort to solve the above-mentioned problems, and provides a steering column for a vehicle that allows an impact absorbing member to absorb an impact generated when an adjusting bolt collides with a tilting guide hole or a telescoping guide hole during a tilting or telescoping operation, thereby improving the operational feeling and reducing operational noise.

In accordance with an aspect of the present invention, there is provided a steering column of a vehicle including: an adjusting bolt that passes through tilting guide holes that have slot shapes and are formed on opposite sides of a plate bracket, and telescoping guide holes that have slot shapes and are formed on opposite sides of a distance bracket; and an impact absorbing member that has a hollow pipe shape into which the adjusting bolt is inserted therein, and has tilting impact absorbing parts, which protrude on an outer peripheral surface thereof supported by opposite lengthwise ends of the tilting guide hole, and telescoping impact absorbing parts, which protrude on the outer peripheral surface thereof supported by opposite lengthwise ends of she telescoping guide hole.

As described above, the steering column for a vehicle can allow an impact absorbing member to absorb an impact that is generated when an adjusting bolt collides with tilting guide hole or telescoping guide hole during a tilting or telescoping operation, thereby improving he operational feeling and reducing operational noise.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
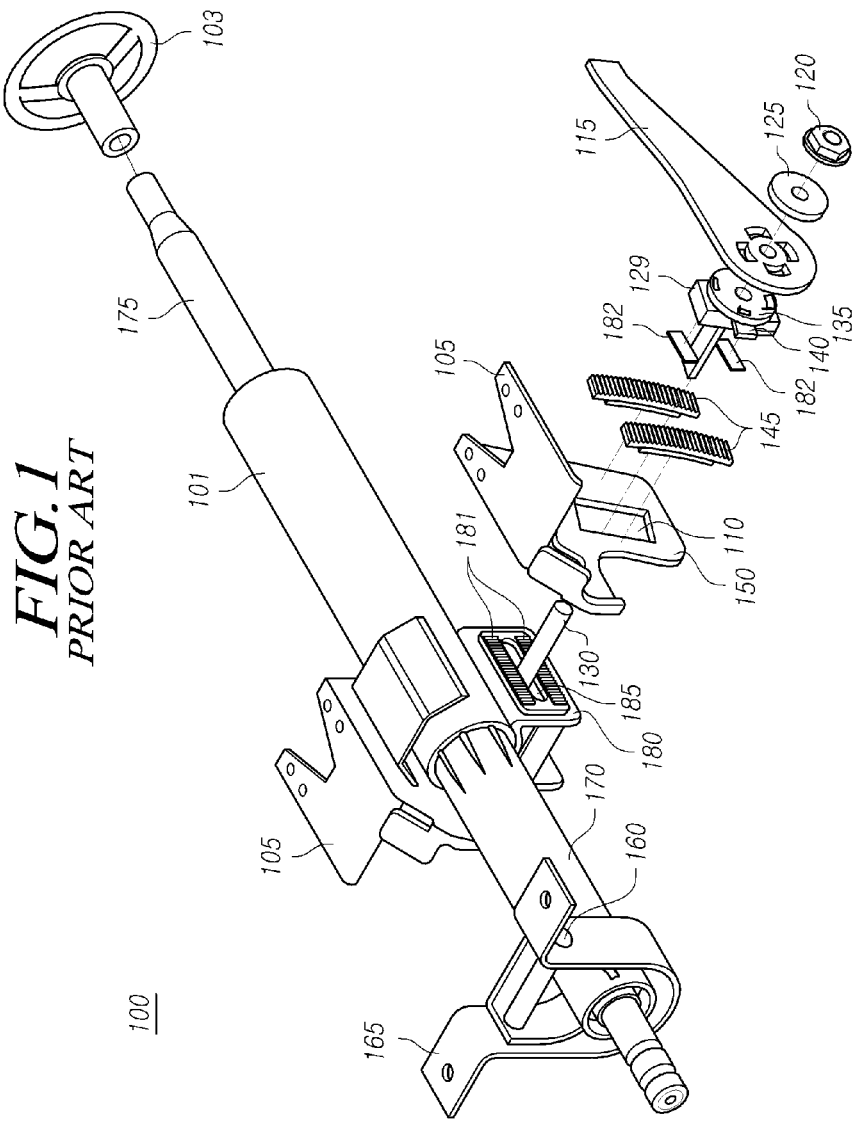
FIG. 1 is an exploded perspective view of a part of a steering column for a vehicle according to the related art.

Hereinafter, an exemplary embodiment of the present invention will be described in detail with reference to the accompanying drawings. In the description of the elements of the present invention, terms "first", "second", "A", "B", "(a)", "(b)" and the like may be used.These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

In the description of the present invention, a side corresponding to a mounting bracket will be designated as an upper side, a side opposite to the upper side will be designated as a lower side, a side to which a steering wheel of a steering shaft will be designated as one side, and a side opposite to the one side will be designated as an opposite side in the drawings for convenience of description unless otherwise mentioned.

Figure 2:
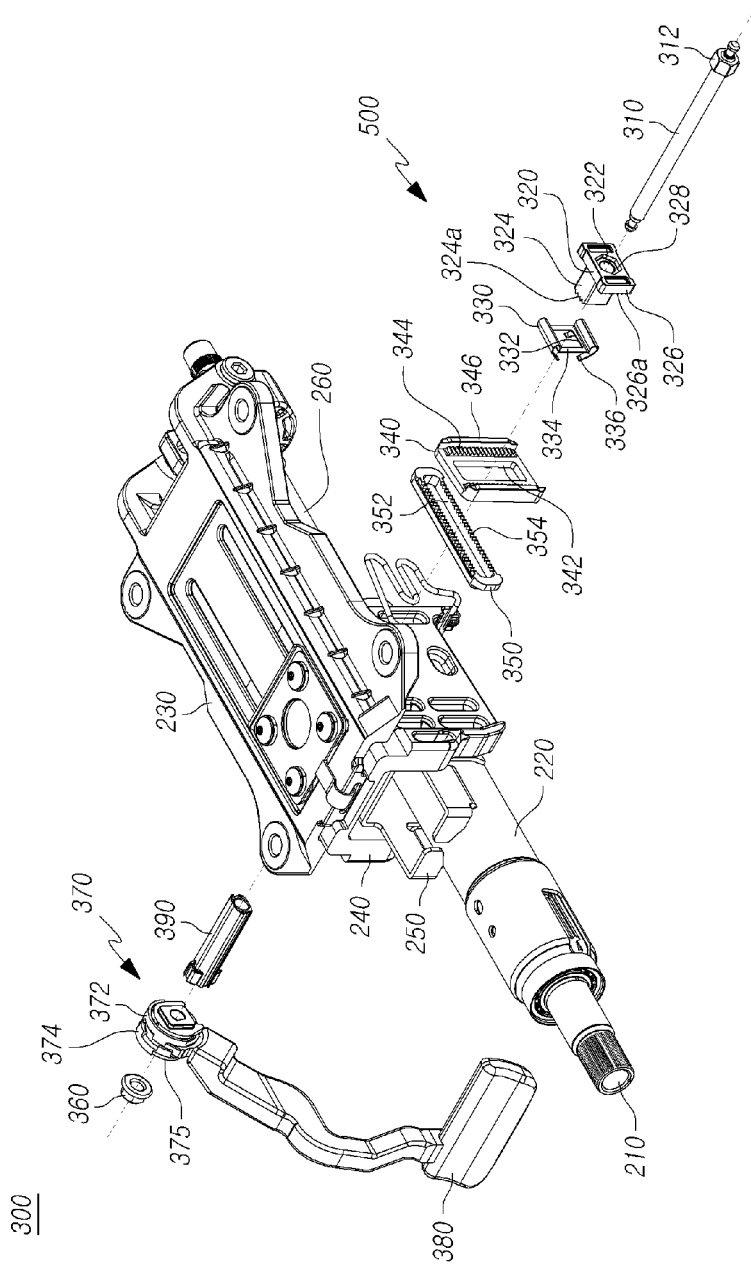
FIG. 2 is an exploded perspective view of a steering column for a vehicle according to the present invention.
Figure 3:
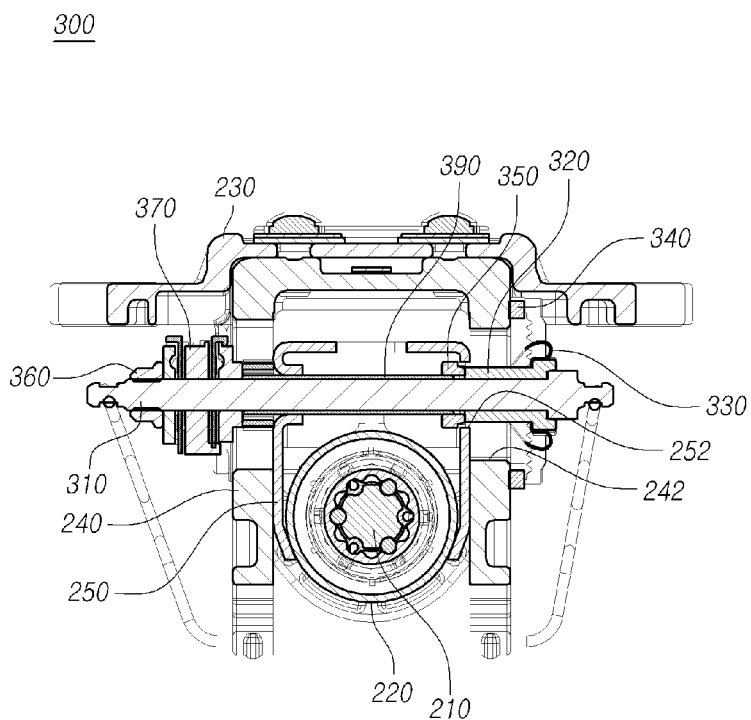
FIG. 3 is a sectional view of a steering column for a vehicle according to the present invention.
Figure 4:
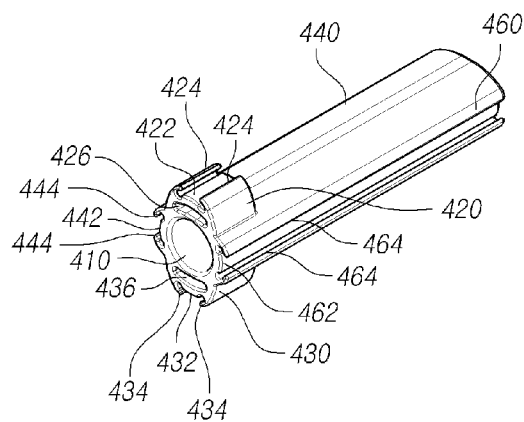
FIG. 4 is a perspective view illustrating an impact absorbing member according to the present invention.
Figure 5:
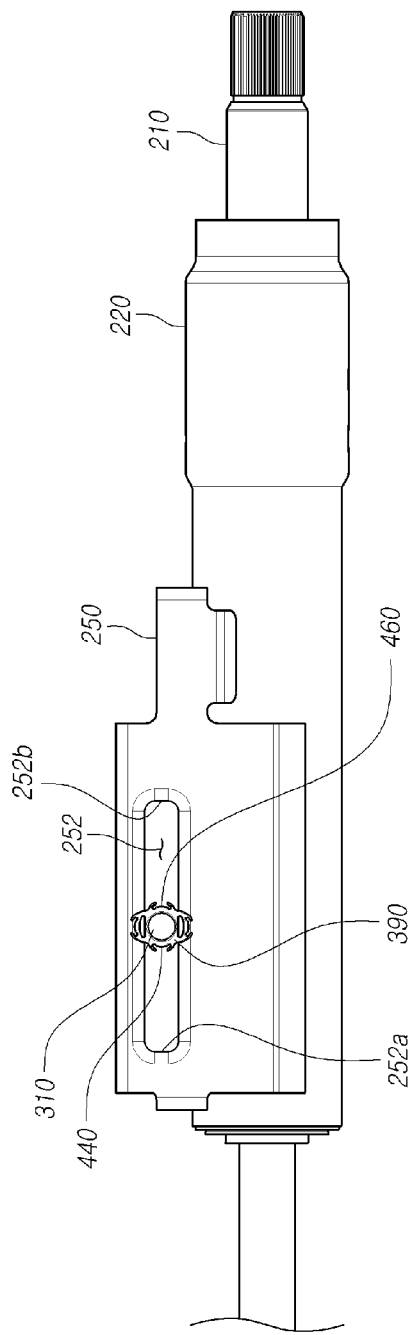
FIG. 5 is a side view illustrating that the impact absorbing member is coupled to a tilting guide hole according to the present invention.
Figure 6:
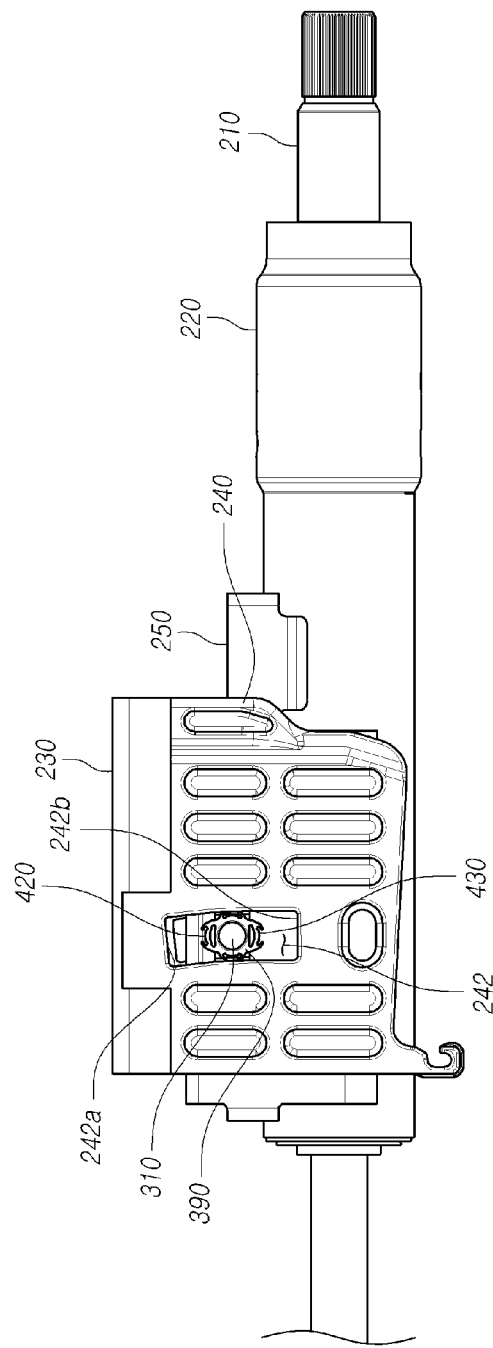
FIG. 6 is a side view illustrating that the impact absorbing member is coupled to a telescoping guide hole according to the present invention.
Figure 7:
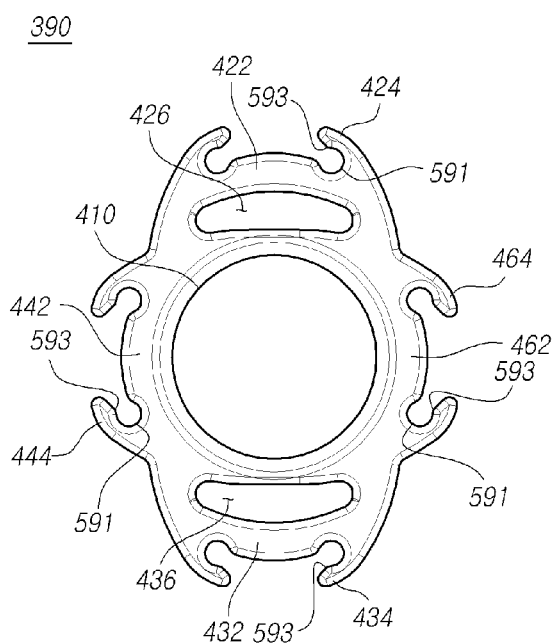
FIGS. 7 and 8 are sectional views of the impact absorbing member according to the present invention.
Figure 8:
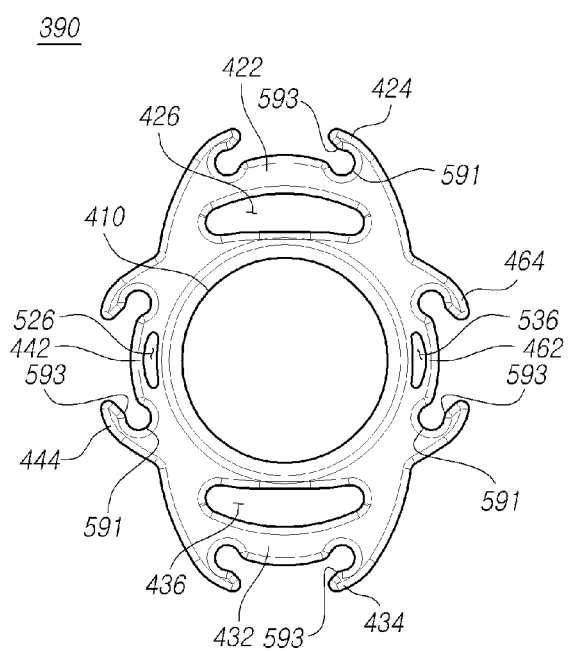

FIG. 2 is an exploded perspective view of a steering column for a vehicle according to the present invention. FIG. 3 is a sectional view of a steering column for a vehicle according to the present invention. FIG. 4 is a perspective view illustrating an impact absorbing member according to the present invention. FIG. 5 is a side view illustrating that the impact absorbing member is coupled to a tilting guide hole according to the present invention. FIG. 6 a side view illustrating that the impact absorbing member is coupled to a telescoping guide hole according to the present invention. FIGS. 7 and 8 are sectional views of the impact absorbing member according to the present invention.

In detail, referring to FIGS. 2 to 4, the steering column 300 includes an adjusting bolt 310 that passes through tilting guide holes 242 having slot shapes and are formed on opposite sides of a plate bracket 240, and telescoping guide holes 252 having slot shapes and formed on opposite sides of a distance bracket 250; and an impact absorbing member 390 having a hollow pipe shape into which the adjusting bolt 310 is inserted therein, and having tilting impact absorbing parts 420 and 430 protruding on an outer peripheral surface thereof supported by opposite lengthwise ends the tilting guide hole 242 and telescoping impact absorbing parts 440 and 460 protruding on the outer peripheral surface thereof supported by opposite lengthwise ends of the telescoping guide hole 252.

An inner tube 260 and an outer tube 220 have hollow tube shapes, and the inner tube 260 is inserted into the outer tube 220.

A steering shaft 210 is inserted into the inner tube 260 and the outer tube 220.

The distance bracket 250 has a substantially inverse U shape to surround an outer periphery of the outer tube 220, and telescoping guide holes 252 having a slot shape, and through which the adjusting bolt 310 passes, are formed on opposite sides of the distance bracket 250.

The plate bracket 240 has a substantially inverse U shape to surround an outer periphery the distance bracket 250, and tilting guide holes 242 having a slot shape, and through which the adjusting bolt 310 passes, are formed on opposite sides of the plate bracket 240.

In this way, the plate bracket 240 is coupled to a mounting bracket 230 by using an impact energy absorbing unit for absorbing impact energy that is generated when a vehicle makes a collision or a rear-end collision to be displaced, and the mounting bracket 230 is fixed to the body shell.

The adjusting bolt 310 passes through the telescoping guide hole 252 of the distance bracket 250 and the tilting guide hole 242 of the plate bracket 240 and is coupled thereto.

A gear assembly 500 includes a telescoping fixed gear 350 coupled to the telescoping guide hole 252 of the distance bracket 250, a tilting fixed gear 340 coupled to the tilting guide hole 242 of the plate bracket 240, a movable gear block 320 having a telescoping actuating gear 324 and a tilting actuating gear 326 enmeshed with the telescoping fixed gear 350 and the tilting fixed gear 340, and a resilient support body 330 interposed between the tilting fixed gear 340 and the movable gear block 320 to provide a resilient support force to the movable gear block 320.

The telescoping fixed gear 350 has a first slot 352 through which the adjusting bolt 310 passes at the center thereof, and first gear rows 354 are formed on the upper and lower sides of the first slot 352 in parallel to each other.

The tilting fixed gear 340 has a second slot 342 through which the adjusting bolt 310 passes, and second gear rows 344 are formed on opposite sides of the second slot 342 in parallel to each other.

That is, the first gear rows 354 are formed towards the movable gear block 320 on the upper and lower sides of the first slot 352 in parallel to each other to be enmeshed with third gear rows 324a of the movable gear block 320, which will be described later, and the second gear rows 344 are formed towards the movable gear block 320 on the opposite sides of the second slot 342 in parallel to each other to be enmeshed with fourth gear rows 326a of the movable gear block 320.

Guide bars 346 protruding towards the movable gear block 320 are formed in the tilting fixed gear 340 on opposite sides of the second gear rows 344, and guides the movement direction of the movable gear block 320.

The movable gear block 320 is configured such that the tilting actuating gears 326 protrude to opposite sides of the movable gear block 320 to correspond to the tilting fixed gears 340, and the telescoping actuating gears 324 protrude towards the telescoping fixed gears 350 to pass through the second slot 342 of the tilting fixed gear 340 and to correspond to the telescoping fixed gears 350.

The movable gear block 320 has a through-hole 322, through which the adjusting bolt 310 passes at the center thereof, fourth gear rows 326a, which are enmeshed with the second gear rows 344, are formed on opposite sides of the tilt actuating gears 326 protruding to the opposite sides of the through-hole 322 in parallel to each other, and third gear rows 324a enmeshed with the first gear rows 354 are formed on the upper and lower sides of the telescoping actuating gears 324 protruding towards the telescoping fixed gears 350 in parallel to each other.

That is, the fourth gear rows 326a are formed towards the tilting fixed gears 340 on opposite sides of the tilting actuating gears 326 that protrude from the opposite sides of the through-hole 322 in parallel with each other to be enmeshed with the second gear rows 344, and the third gear rows 324a are formed towards the telescoping fixed gears 350 on the upper and lower sides of the telescoping actuating gears 324 that protrude towards the telescoping fixed gears 350 in parallel with each other to be enmeshed with the first gear rows 354.

As illustrated, the movable gear block 320 has a square block shape, and a stepped recess 323 recessed in a polygonal shape is formed around the through-hole 322 on a surface opposite to the surface on which the third and fourth gear rows 324a and 326a are formed.

In addition, a head 312 having a polygonal shape is formed at an end of the adjusting bolt 310, and the polygonal he 312 of the adjusting bolt 310 is inserted into the polygonal stepped recess 322 of the movable gear block 320 and is firmly coupled to the stepped recess 328.

The resilient body 330 includes a hollow body 334 with which the movable gear block 320 makes contact to be supported, and resilient support leas 336 that protrude from opposite sides of the body 334 towards the movable gear block 320, are bent towards the tilting fixed gears 340, and are supported by the tilting fixed gears 340 to provide a resilient support force for the movable gear block 320.

The body 334 has a hole 332 through which the adjusting bolt 310 passes at the center thereof, and makes contact with a surface between the telescoping actuating gears 324 and the fourth gear rows 326a of the movable gear block 320 in order to stably support the movable gear block 320.

The resilient support legs 336 are formed to provide a resilient support force for the movable gear block 320, and are supported by a surface between the second slot 342 and the second gear rows 344 of the tilting fixed gears 340, and because the resilient support legs 336 protrude from the opposite sides of the body 334 towards the movable gear block 320 and are bent towards the tilting fixed gears 340 again, portions of the resilient support legs 336 that protrude towards the movable gear block 320 may support the movable gear block 320 more stably.

The impact absorbing member 390 has a bolt insertion hole 410 that has a hollow pipe shape and the adjusting bolt 310 is inserted into the bolt insertion hole 410 such that the bolt insertion hole 410 surrounds the adjusting bolt 310 passing through the tilting guide hole 242 and the telescoping guide hole 252.

In order to absorb an impact that is generated when the adjusting bolt 310 collides with the tilting guide hole 242 and the telescoping guide hole 252 during a tilting or telescoping operation, tilting impact absorbing parts 420 and 430, which protrude from an outer peripheral surface of the impact absorbing member 390 that is supported by opposite lengthwise ends of the tilting guide hole 242, and telescoping impact absorbing parts 440 and 460, which protrudie from an outer peripheral surface of the impact absorbing member 390 that is supported by lengthwise opposite ends of the telescoping guide hole 252, are formed.

The impact absorbing member 390 may be formed of a resilient material such as silicon, urethane, rubber, or a plastic resin or is molded of a resilient material, such as silicon, urethane, or rubber in a plastic resin body having a hollow pipe shape to have the tilting impact absorbing parts 420 and 430, which protrude from the outer peripheral surface of the impact absorbing member 390 that is supported by the opposite lengthwise ends of the tilting guide hole 242, and the telescoping impact absorbing parts 440 and 460, which protrude on the outer peripheral surface of the impact absorbing member 390 that is supported by the opposite lengthwise ends of the telescoping guide hole 252.

The telescoping impact absorbing parts 440 and 460 include a first impact absorbing part 442 protruding towards one lengthwise end of the telescoping guide hole 252 and a second impact absorbing part 162 protruding towards an opposite end thereof.

The first impact absorbing part 442 includes a pair of bosses 444 that protrude from opposite sides of an outer peripheral surface of the first impact absorbing part 442 to face each other circumferentially such that impact energy may be decreased in stages, and the second impact absorbing part 462 includes a pair of second bosses 464 protruding from opposite sides an outer peripheral surface of the second impact absorbing part 462 to face each other circumferentially such that impact energy may be decreased in stages.

Recesses 591 that are recessed roundly inwards are provided at connection portions between the opposite sides of an outer peripheral surface of the first impact absorbing part 442 and the first bosses and between the opposite sides of an outer peripheral surface of the second impact absorbing part 462 and the second bosses 464, so that the first bosses 444 and the second bosses 464 may easily be resiliently deformed inwards and the first bosses 444 and the second bosses 464 may be prevented from being torn or separated even after the steering column is used as well.

The first bosses 444 protrude on an incline from an outer peripheral surface of the first impact absorbing part 442 to face each other circumferentially to absorb an impact while being shrunk when making contact with the telescoping guide hole 252, and the second bosses 464 also protrude on an incline from an outer peripheral surface of the second impact absorbing part 462 to face each other circumferentially in order to absorb an impact while being shrunk when making contact with the telescoping guide hole 252.

Accordingly, as illustrated in FIG. 5, if the first bosses 444 and she second bosses 464 collide with one side 252a or an opposite side 252b of the telescoping guide hole 252, the shapes of the first bosses 444 and the second bosses 464 are deformed to absorb impact energy while being shrunk.

The first bosses 444 and the second bosses 464 have support portions 593 protruding from inner surfaces of ends connected to the recesses 591, and accordingly, when the impact absorbing member 390 makes contact with the telescoping guide hole 252, the support portions 593 are supported by the first impact absorbing part 442 and the second impact absorbing part 462 to be resiliently deformed together while the first bosses 444 and the second bosses 464 are bent inwards, so that then entire impact absorbing member 390 gradually absorbs an impact from the outside to the inside.

Hollow portions 526 and 536 are provided between the bolt insertion hole 410 into which the adjusting bolt 310 is inserted and the telescoping impact absorbing parts 440 and 460, so that an additional impact may be absorbed when the entire impact absorbing member 390 gradually absorbs an impact from the outside to the inside.

Meanwhile, the tilting impact absorbing parts 420 and 430 include a third impact absorbing part 422 protruding from an outer peripheral surface of the impact absorbing member 390 towards one lengthwise end of the tilting guide hole 242, and a fourth impact absorbing part 432 protruding towards an opposite lengthwise end of the tilting guide hole 242.

The third impact absorbing part 422 has a pair of third bosses 424 that protrude from opposite sides of an outer peripheral surface thereof to face each other circumferentially such that impact energy may be decreased in stages, and the fourth impact absorbing part 432 has a pair of fourth bosses 434 that protrude from opposite sides of the outer peripheral surface thereof to face each other circumferentially such that impact energy may be decreased in stages.

Recesses 591 that are recessed roundly inwards are provided at connection portions between the opposite sides of an outer peripheral surface of the third impact absorbing part 422 and the third bosses, and between the opposite sides of an outer peripheral surface of the fourth impact absorbing part 432 and the fourth bosses 434, so that the third bosses 424 and the fourth bosses 434 may easily be resiliently deformed inwards and the third bosses 424 and the fourth bosses 434 may be prevented from being torn or separated even after the steering column is used as well.

The third bosses 424 protrude on an incline from an outer peripheral surface of the third impact absorbing part 442 to face each other circumferentially to absorb an impact while being shrunk when making contact with the tilting guide hole 242, and the fourth bosses 434 also protrude on an incline from an outer peripheral surface of the fourth impact absorbing part 462 to face each other circumferentially to absorb an impact while being shrunk when making contact with the tilting guide hole 242

Accordingly, as illustrated in FIG. 5, if the third bosses 424 and the fourth bosses 434 collides an upper side 242a or a lower side 242b of the tilting guide hole 242, the shapes of the third bosses 424 and the fourth bosses 434 are deformed to absorb impact energy generated while they are shrunk.

The third bosses 424 and the fourth bosses 434 have support portions 593 protruding from inner surfaces of ends connected to the recesses 591, and accordingly, when the impact absorbing member 390 makes contact with the tilting guide hole 242, the support portions 593 are supported by the third impact absorbing part 422 and the fourth impact absorbing part 432 to be resiliently deformed together while the third bosses 424 and the fourth bosses 434 are bent inwards, so that the entire impact absorbing member 390 gradually absorbs an impact from the outside to the inside Hollow portions 426 and 436 are provided between the bolt insertion hole 410 into which the adjusting bolt 310 is inserted and the tilting impact absorbing parts 420 and 430, so that an additional impact may be absorbed when the entire impact absorbing member 390 gradually absorbs an impact from the outside to the inside.

That is, due to the hollow portions 426 and 436, during a tilting operation, the third impact absorbing part 422 and the fourth impact absorbing part 432 collides with opposite sides of the tilting guide hole 242 and impact energy is additionally absorbed while the shapes of the hollow portions 426 and 436 are deformed at the same time.

Here, impact absorbing member 390 may be configured such that hollow portions are formed only between the bolt insertion hole 410 and the tilting impact absorbing parts 420 and 430 as illustrated in FIG. 7, or may be formed between the telescoping impact absorbing parts 440 and 460 and the bolt insertion hole 410 as well as between the bolt insertion hole 410 and the tilting impact absorbing parts 420 and 430 as illustrated in FIG. 8.

That is, due the hollow portions, during a telescoping or tilting operation, the first impact absorbing part 442 and the second impact absorbing part 462, and the third impact absorbing part 422 and the fourth impact absorbing part 432, may collide with opposite sides of the telescoping guide hole 252 and opposite sides of the tilting guide hole 242, respectively, and an impact may be gradually absorbed while the shapes of the hollow portions are deformed.

A cam assembly 310 includes a fixed cam 372 coupled to a side that is opposite to a side to which the gear assembly 500 of the plate bracket 240 is coupled and having a first cam boss, and an actuating cam 374 having a second cam boss in contact with the first cars boss, and to which an adjusting lever 380 is coupled.

Accordingly, if the driver rotates the adjusting lever 380 in one direction or an opposite direction, the second cam boss of the actuating cam 374 is moved along the first cam boss of the fixed cam 372, and accordingly, the adjusting lever 380 is locked or unlocked while the interval between the actuating cam 374 and the fixed cam 372 is changed.

Meanwhile, the adjusting bolt 310 passes through the movable gear block 320, the resilient support 330, the tilting fixed gear 340, the plate bracket 240, the telescoping fixed gear 350, the distance bracket 250, the fixed cam 372, and the actuating cam 374 to be coupled thereto, and the head 312 is formed at an end to which the movable gear block 320 is coupled as described above, and a bearing 375, a fixing nut 360, and the like are sequentially coupled to an opposite end thereof.

An example of an operation of the steering column 300 for a vehicle, according to the embodiment of the present invention, will be described with reference to the accompanying drawings.

If the driver locks the adjusting lever 380, the actuating cam 374 and the fixed cam 372 are spaced apart from each other so that the head 312 of the adjusting bolt 310 pulls the movable gear block 320 in a pressing direction, and accordingly, the distance bracket 250 is pressed and the outer peripheral surface of the outer tube 220 is pressed and attached while a space in the plate bracket 240 is narrowed, and the second gear rows 344 of the tilting fixed gear 340 and the fourth gear rows 326a of the tilting actuating gear 326, and the first gear rows 354 of the telescoping fixed gear 350 and the third gear rows 324a of the telescoping actuating gear 324 are enmeshed with each other so that the tilting and telescoping operations are completed and the steering shaft 210 is fixed.

To the contrary, if the driver unlocks the adjusting lever 380, the adjusting bolt 310 is moved in an opposite direction while the actuating cam 370 and the fixed cam 370, which are separated from each other, return to the original positions, and accordingly, the distance bracket 250 and the outer tube 220b are moved while the narrowed space of the plate bracket 240 is widened and a tilting operation and a. telescoping operation are made possible while the enmeshed states of the fourth gear rows 326a and the third gear rows 324a of the movable gear block 320 that are enmeshed with the second gear rows 344 of the tilting fixed gear 340 and the first gear rows 354 of the telescoping fixed gear 350 are released.

Then, during a tilting or telescoping operation, the impact absorbing member 390 absorbs an impact that is generated when the adjusting bolt 310 collides with the tilting guide hole 242 or the telescoping guide hole 252, thereby reducing operational noise.

As described above, the steering column for a vehicle can allow an impact absorbing member to absorb an impact that is generated when an adjusting bolt collides with a tilting guide hole or a telescoping guide hole during a tilting or telescoping operation, thereby improving the operational feeling and reducing operational noise.

Even if it was described above that all of the components of an embodiment of the present invention are coupled as a single unit or coupled to be operated as a single unit, the present invention is not necessarily limited to such ah embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A steering column of a vehicle comprising:
an adjusting bolt that passes through tilting guide holes having slot shapes and formed on opposite sides of a plate bracket, and telescoping guide holes having slot shapes and formed on opposite sides of a distance bracket; and
an impact absorbing member having a hollow pipe shape into which the adjusting bolt is inserted therein, and having tilting impact absorbing parts protruding on an outer peripheral surface thereof supported by opposite lengthwise ends of the tilting guide hole and telescoping impact absorbing parts protruding on the outer peripheral surface thereof supported by opposite lengthwise ends of the telescoping guide hole.

2. The steeling column of claim 1, wherein the telescoping impact absorbing parts comprise a first impact absorbing part protruding from the outer peripheral surface of the impact absorbing member towards one lengthwise end of the telescoping guide hole, and a second impact absorbing part protruding towards an opposite lengthwise end of the telescoping guide hole.

3. The steering column of claim 2, wherein the telescoping impact absorbing parts comprise a pair of first bosses protruding from opposite sides of an outer peripheral surface of the first impact absorbing part is provided, and a pair of second bosses protruding from opposite sides of an outer peripheral surface of the second impact absorbing part is provided.

4. The steering column of claim 3, wherein recesses that are roundly recessed inwards are provided at connection portions of opposite sides of an outer peripheral surface of the first impact absorbing part and the first bosses, and connection portions of opposite sides of an outer peripheral surface of the second impact absorbing part and the second bosses.

5. The steering column of claim 4, wherein the first bosses protrude on an incline from an outer peripheral surface of the first impact absorbing part to face each other circumferentially in order to absorb an impact while being shrunk when making contact with the telescoping guide hole, and the second bosses also protrude on an incline from an outer peripheral surface of the second impact absorbing part to face each other circumferentially so absorb an impact while being shrunk when making contact with the telescoping guide hole.

6. The steering column of claim 5, wherein the first bosses and the second bosses have support portions protruding from inner surfaces of ends connected to the recesses so that when the impact absorbing member makes contact with the telescoping guide hole, the support portions are supported by the first impact absorbing part and the second impact absorbing part while the first bosses and the second bosses are bent inwards.

7. The steering column of claim 1, wherein the impact absorbing member has hollow portions between the bolt insertion hole, into which the adjusting bolt is inserted, and the telescoping impact absorbing parts.

8. The steering column of claim 1, wherein the tilting impact absorbing part comprises a third impact absorbing part protruding from the outer peripheral surface of the impact absorbing member towards one lengthwise end of the tilting guide hole, and a fourth impact absorbing part protruding towards an opposite lengthwise end of the tilting guide hole.

9. The steering column of claim 8, wherein the tilting impact absorbing part comprises a pair of third bosses protruding from opposite sides of an outer peripheral surface of the third impact absorbing part is provided, and a pair of fourth bosses protruding from opposite sides of an outer peripheral surface of the fourth impact absorbing part is provided.

10. The steering column of claim 9, wherein recesses that are roundly recessed inwards are provided at connection portions of opposite sides of an outer peripheral surface of the third impact absorbing part and the third bosses, and connection portions of opposite sides of an outer peripheral surface of the fourth impact absorbing part and the fourth bosses.

11. The steering column of claim 10, wherein the third bosses protrude on an incline from an outer peripheral surface of the third impact absorbing part to face each other circumferentially in order to absorb an impact while being shrunk when making contact with the tilting guide hole, and the fourth bosses also protrude on an incline from an outer peripheral surface of the fourth impact absorbing part to face each other circumferentially in order to absorb an impact while being shrunk when making contact with the tilting guide hole.

12. The steering column of claim 11, wherein the third bosses and the fourth bosses have support portions protruding from inner surfaces of ends connected to the recesses so that when the impact absorbing member makes contact with the tilting guide hole, the support portions are supported by the third impact absorbing part and the fourth impact absorbing part while the third bosses and the fourth bosses are bent inwards.

13. The steering column of claim 1, wherein the impact absorbing member has hollow portions between the bolt insertion hole, into which the adjusting bolt is inserted, and the tilting impact absorbing parts.

* * * * *